(12) United States Patent
Pedersen et al.

(10) Patent No.: US 11,964,849 B2
(45) Date of Patent: Apr. 23, 2024

(54) SYSTEM AND METHOD FOR HANDLING WIND TURBINE COMPONENTS FOR ASSEMBLY THEREOF

(71) Applicant: Vestas Wind Systems A/S, Aarhus N. (DK)

(72) Inventors: Gunnar K. Storgaard Pedersen, Skjern (DK); Ivar J. B. K. Jensen, Hornslet (DK); Christian Skov Frederiksen, Videbæk (DK)

(73) Assignee: Vestas Wind Systems A/S, Aarhus N. (DK)

( * ) Notice: Subject to any disclaimer, the term of this patent is extended or adjusted under 35 U.S.C. 154(b) by 897 days.

(21) Appl. No.: 16/975,478

(22) PCT Filed: Jan. 21, 2019

(86) PCT No.: PCT/DK2019/050023
§ 371 (c)(1),
(2) Date: Aug. 25, 2020

(87) PCT Pub. No.: WO2019/166066
PCT Pub. Date: Sep. 6, 2019

(65) Prior Publication Data
US 2021/0024333 A1 Jan. 28, 2021

(30) Foreign Application Priority Data
Mar. 2, 2018 (DK) .......................... PA 2018 70138

(51) Int. Cl.
*B66C 25/00* (2006.01)
*B66C 13/48* (2006.01)

(52) U.S. Cl.
CPC .............. *B66C 13/48* (2013.01); *B66C 25/00* (2013.01)

(58) Field of Classification Search
CPC ................................. B66C 13/48; B66C 25/00
See application file for complete search history.

(56) References Cited

U.S. PATENT DOCUMENTS

| 2007/0151194 A1* | 7/2007 | Livingston | ............ B66C 23/207 52/651.05 |
| 2009/0299551 A1* | 12/2009 | So | .......................... B64C 19/00 701/3 |

(Continued)

FOREIGN PATENT DOCUMENTS

| CN | 101432216 A | 5/2009 |
| CN | 102418678 A | 4/2012 |

(Continued)

OTHER PUBLICATIONS

Danish Patent and Trademark Office, Search and Examination Report in PA 2018 70138, Aug. 29, 2018.

(Continued)

*Primary Examiner* — Lynn E Schwenning
(74) *Attorney, Agent, or Firm* — Wood Herron & Evans LLP

(57) ABSTRACT

A method of handling a wind turbine component (54) for assembly or maintenance, comprises coupling one or more unmanned air vehicles (20) with the wind turbine component (54) so that at least a portion of the weight of the wind turbine component (54) can be supported and lifted by the one or more unmanned air vehicles (20). The method further comprises coupling one or more cranes (50) with the wind turbine component (54) so that at least a portion of the weight of the wind turbine component (54) can be supported and lifted by the one or more cranes (50). The method further comprises controlling the one or more unmanned air vehicle (20) and crane (50) in coordination to lift the wind (Continued)

turbine component (54) and manoeuvre said component (54) with respect to a wind turbine (52).

22 Claims, 7 Drawing Sheets

(56) References Cited

U.S. PATENT DOCUMENTS

| | | | |
|---|---|---|---|
| 2011/0116905 A1* | 5/2011 | Von Kessel | B64B 1/50 244/33 |
| 2015/0158576 A1* | 6/2015 | Jones | B64D 1/22 701/2 |
| 2016/0083115 A1* | 3/2016 | Hess | G05D 1/0866 701/3 |
| 2016/0318609 A1 | 11/2016 | Lynn et al. | |
| 2016/0340006 A1* | 11/2016 | Tang | G16H 40/67 |
| 2016/0378108 A1* | 12/2016 | Paczan | B64U 20/00 705/330 |
| 2017/0043872 A1* | 2/2017 | Whitaker | A62C 3/0242 |
| 2020/0180763 A1* | 6/2020 | Schütz | B64C 39/024 |

FOREIGN PATENT DOCUMENTS

| | | | |
|---|---|---|---|
| CN | 102803070 A | 11/2012 | |
| CN | 102906420 A | 1/2013 | |
| DE | 19911617 A1 | 9/2000 | |
| DE | 102017112765 | * 12/2018 | ............ B66C 25/00 |
| DK | 201671003 A1 | 11/2017 | |
| EP | 2245304 B1 | 11/2010 | |
| EP | 2280138 A2 | 2/2011 | |
| EP | 2344753 B1 | 7/2011 | |
| EP | 2520533 A1 | 11/2012 | |
| EP | 2550453 B1 | 1/2013 | |
| WO | 2010051278 A1 | 5/2010 | |
| WO | 2015086030 A1 | 6/2015 | |
| WO | 2018224657 A1 | 12/2018 | |
| WO | 2019001665 A1 | 1/2019 | |

OTHER PUBLICATIONS

European Patent Office, International Search Report and Written Opinion in PCT Application Serial No. PCT/DK2019/050023, Apr. 26, 2019.
China National Intellectual Property Administration, First Notification of Office Action in CN Application No. 201980027252.4, Mar. 3, 2022.
China National Intellectual Property Administration, Decision of Rejectionin CN Application No. 201980027252.4, Jun. 30, 2022.
China National Intellectual Property Administration, 2nd Notification of Office Action in CN Application No. 201980027252.4, May 7, 2022.

* cited by examiner

SYSTEM AND METHOD FOR HANDLING WIND TURBINE COMPONENTS FOR ASSEMBLY THEREOF

FIELD OF THE INVENTION

This invention is directed to the handling of wind turbine components such as in the assembly and disassembly of various parts of a wind turbine.

BACKGROUND OF THE INVENTION

Wind turbines are large structures which comprise many heavy components such as generating equipment, tower segments, wind turbine blades and so on.

Known approaches for assembling wind turbines typically involve the use of heavy lift plant equipment such as cranes to lift the large and heavy wind turbine components into the correct position so that they can be connected together. Similarly, heavy lift equipment also needs to be brought in for many maintenance tasks associated with a wind turbine. For example, in the unlikely event that a blade bearing is found to be defective, then a crane would need to be brought into position. Using a suitable supporting sling, the crane can then remove the blade from the hub once maintenance personnel have detached the blade.

These known approaches to handling wind turbine components are manual in nature and involve the use of large-scale plant equipment together. Numerous technicians are required to control that equipment and to provide close-quarters support to guide the wind turbine components into position. These methods can be inefficient and require a considerable number of personnel all of which are required to have high levels of safety certifications in order to minimise the risk during such a procedure.

It is against this background that the embodiments of the invention have been devised to provide improved, more efficient, safe, and cost effective approaches for handling wind turbine components for the purposes of assembly and maintenance.

STATEMENT OF INVENTION

In accordance with the invention, there is provided a method of handling a wind turbine component for assembly or maintenance. The method comprises coupling one or more unmanned air vehicles with the wind turbine component so that at least a portion of the weight of the wind turbine component can be supported and lifted by the one or more unmanned air vehicles, coupling one or more cranes with the wind turbine component so that at least a portion of the weight of the wind turbine component can be supported and lifted by the one or more cranes and controlling the one or more unmanned air vehicles and cranes in coordination to lift the wind turbine component and manoeuvre said component with respect to a wind turbine. The wind turbine component may be a wind turbine blade, for example.

In embodiments, the one or more crane is attached to the component at a first position and the one or more unmanned air vehicle is attached to the component at a second position spaced from the first position.

The unmanned air vehicle supports the component by way of a lifting device such that the unmanned air vehicle can support the component from above. For example, the one or more crane may support the component by way of a hook, clamp or sling.

Embodiments of the invention may comprise coupling a plurality of unmanned air vehicles to the component for handling thereof.

The one or more crane may be mounted to the wind turbine. For example, the crane may be mounted to the hub, nacelle, tower, blade. The crane may be mounted such that it can sustain at least a portion of the weight of the component. In embodiments, the crane is mounted to a nacelle of the wind turbine, for example a structure of or associated with the nacelle of the wind turbine.

The method may further comprise mounting the one or more crane to the wind turbine using one or more unmanned air vehicles.

In embodiments, the at least one crane supports and lifts at least 50% of the weight of the component during handling thereof. For example, the crane may support and lift 50%-90% of the component. In embodiments, the crane and unmanned air vehicle together support substantially the entire weight of the component during handling thereof. In embodiments, the crane may sustain the majority of the weight for example, the crane may support and lift 80-90% of the weight of the component with the remainder of the weight of the component being supported by the unmanned air vehicle.

The relative positions of the unmanned air vehicles and cranes may be coordinated so that the wind turbine component is lifted in a predetermined orientation. In embodiments, one of either the unmanned air vehicles or crane is designated a master device, the other of the unmanned air vehicles or crane being slave device, whereby the relative positions of the slave device are coordinated with that of the master device. The master device may send signals to the slave device to coordinate movement thereof.

The method may further include guiding the component to the wind turbine using a guidance system. The guidance system may be an optical guidance system, a radar-based guidance system or a lidar based guidance system, for example.

Also in accordance with the invention, there is provided a method of installing a crane on to a wind turbine. The method comprises coupling an unmanned air vehicle with the crane and positioning the crane with respect to the wind turbine using the unmanned air vehicle.

Also in accordance with the invention, there is provided a system for handling a component of a wind turbine. The system comprises an unmanned air vehicle, a crane, one or more coupling means configured to couple the unmanned air vehicle and the crane to the component such that operation of the unmanned air vehicle and crane causes movement of the component and a control means to control the unmanned air vehicle and the crane in coordination so as to manoeuvre the component. The wind turbine component may be a wind turbine blade, for example.

The system may further comprise a control station computer system for controlling movement of the unmanned air vehicle and/or crane.

The unmanned air vehicle may be configured to implement autonomous flight routines.

In embodiments, one of the unmanned air vehicle or crane is configured as a master device, and the other of the unmanned air vehicle or crane is configured as a slave device, wherein the slave device coordinates its movement with the movement of the master device.

The system may further comprise a guidance system associated with the wind turbine component. The guidance system may be adapted to communicate with the unmanned air vehicle and or crane in order to guide the wind turbine component towards a target position. The guidance system may include one or more of an optical guidance system, a radar-based guidance system or a lidar based guidance system, for example.

The crane may be removably attachable to the wind turbine and/or the crane may be configured for attachment to a nacelle of a wind turbine, such as a structure of or associated with the nacelle.

In embodiments of any of the above described methods or systems the unmanned air vehicle may be electrically powered.

BRIEF DESCRIPTION OF THE DRAWINGS

The invention will now be described by way of example with reference to the accompanying drawings, in which.

DETAILED DESCRIPTION OF EMBODIMENTS

Embodiments of the invention provide unmanned aircraft systems (UAS) and unmanned air vehicles (UAV) or drones, in order to provide an efficient approach to handle wind turbine components to aid wind turbine assembly and maintenance. The embodiments of the invention will be described in the context of that component being a wind turbine blade, although it should be noted that this is meant simply as an example and the method and systems of the invention may be used to handle other wind turbine components, suitable adapted where necessary and appropriate. For brevity, this discussion will refer to a 'drone' as any type of unmanned air vehicle, be it a relatively small-scale rotorcraft such as a multirotor, for example a tricopter, quadcopter, pentacopter, hexacopter, octocopter or a larger-scale unmanned helicopter.

In general, the embodiments of the invention provide a novel approach for handling components in which drones are used, in conjunction with one or more cranes, to lift components of a wind turbine for assembly, disassembly or maintenance purposes. In the main embodiments a single drone is used for this purpose, which may be a single heavy-lift drone, such as a remote controlled helicopter, for providing assistance in lifting and positioning a relatively heavy component such as a wind turbine blade. However, embodiments of the invention may also include the use of a plurality of drones, working together in cooperation to lift a heavy load to the required position and in the correct orientation with the assistance of one or more cranes.

Figure 1:
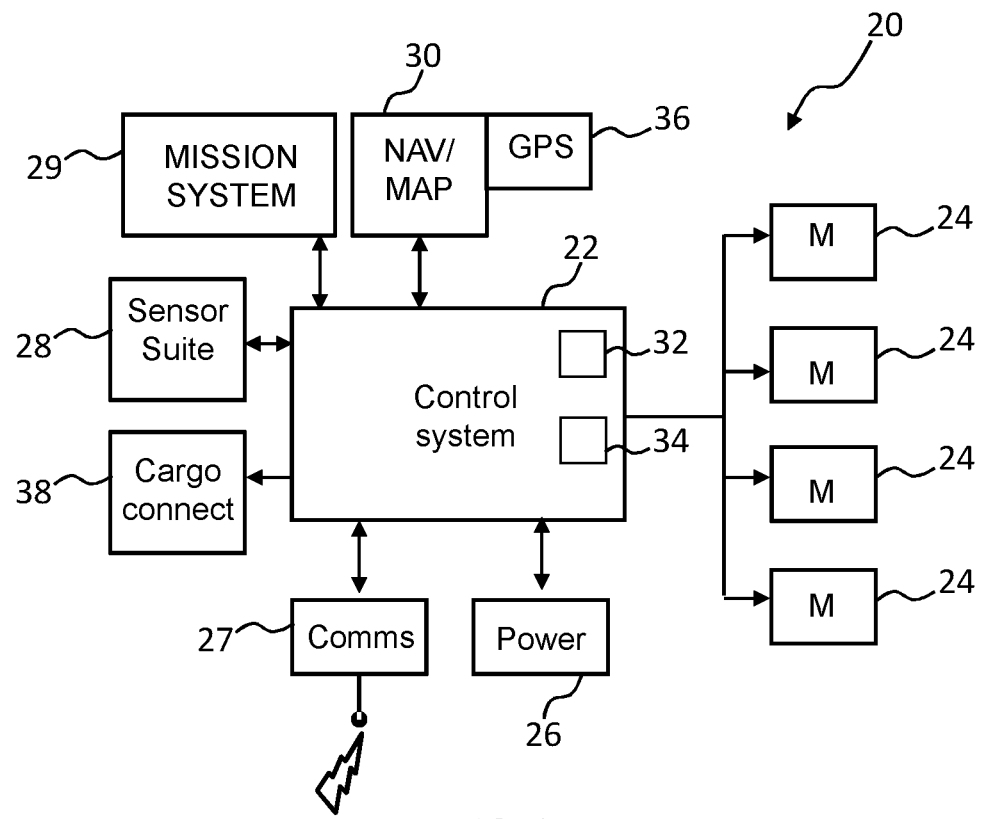
FIG. 1 is a schematic diagram of an exemplary unmanned air vehicle system for use in the embodiments of the invention.

To put the invention into context, FIG. 1 illustrates a system diagram of a typical architecture of a drone platform 20 which may be used in the implementation of the embodiments of the invention. In overview, the drone 20 includes: a control system 22, one or more propulsion units 24, a power system 26, a communication system 27, a sensor suite 28, mission planning system 29 and a navigation system 30. The drone system 20 may be operated in conjunction with a ground-or base-station computer system 31, hereinafter referred to as the 'ground-station', which will be described in more detail later with reference to FIG. 2.

The control system 22 is the main computing unit that controls the flight of the drone 20 by controlling the propulsion units 24 based on inputs from the sensor suite 28 and navigation system 30. The control system 22 may implement remote control flight based on received control inputs from a ground based controller, autonomous flight, based on its internal mission planning algorithms, or semi-autonomous flight, in which a blend of on-board mission planning and ground based direction are used. The main responsibility of the control system 22 is as a lower layer controller which is responsible for positional control of the drone (altitude and lateral position), attitude control (pitch, roll and yaw), and velocity control (horizontal and vertical speed) based on remote control actions or based on self-generated flight directions. The control system 22 comprises a suitable processing environment having a processor 32 and a memory 34 with associated on-board communications functionality, such as a data bus, so it is able to communicate with other on-board systems.

To directly control the flight profile the control system 22 communicates with the one or more propulsion units 24. Four propulsion units 24 are shown here, as would be consistent with the drone system 20 being a multirotor. However, more or fewer propulsion units are also appropriate. For example an autonomous helicopter may have a single propulsion unit. The propulsion units may be any suitable units for providing controllable flight for the drone, and may be electric motors driving suitable rotor blades, as are typical with multirotor of varying size and lift capacities. However, the propulsion units 24 may also be gas turbines or internal combustion engines, for example.

The on-board power system 26 is selected to be suitable for the propulsion units 24. For example, for electric motors the on-board power system 26 may be a battery pack, a fuel cell, or even an external power plug so as to receive electrical power from an external source. Conversely, the power system 26 could be an on-board fuel tank in the event that the propulsion units are gas-turbines or ICEs.

The communication system 27 provides the means to send and receive data to and from systems that are external to the drone 20. For example, the drone 20 may send telemetry data to the base station 31, and may send positional, attitude and velocity data to other drones operating in the area, either as part of a drone swarm or operated independently. The communication system 27 may also receive data from external systems, and in this context it may receive remote control commands from the base station if the drone 20 is operated in remote control flight mode. Alternatively it may upload mission data from the base station. The communication system 27 also permits incoming and outgoing communication with other drones so that flight paths and mission objectives can be coordinated with them to achieve a collective goal. The communication system may direct signals by any means known in the art including, but not limited to, cellular or other phone-based networks, over remote control radio frequency links, UHF or L-band frequency links, microwave frequency links, or other appropriate datalinks, networks, or communication paths.

The sensor suite 28 is operably connected to the control system 22 and provides appropriate sensor data to assist with the operation of the drone. For example, the sensor suite 28 may comprise proximity detectors, a satellite based positioning system, including for example differential GPS, RTK-GNSS, PPP-GNSS or any other local positioning system set up for positioning control, optical still and video cameras for carrying out inspection and guidance tasks, inertial navigation systems to name a few examples. Typically such a sensor suite 28 would be adaptable to carry more or fewer sensors as required for a particular task. Note that in this context the GPS unit may receive signals directly from satellites in order to fix the position of the drone, although another option would be to implement a differential GPS system (known in the art) which receives signals from a ground-based differential GPS beacon in order to provide a higher positional accuracy compared to direct GPS. Note that a GPS unit 36 is shown here as integral with the navigation system 30.

Mission planning system 29 provides a link to the base station to store missions that have been generated thereon and to which the drone follows in use. The mission planning system 29 may include suitable memory storage and algorithms to store, provide and generate on the fly appropriate mission objectives, waypoints, operational envelopes and so on.

Navigation system 30 provides control inputs to the flight control system 22 regarding path following based on input from GPS data from the sensor suite 28.

In addition to the operational systems described above, the drone 20 also includes a cargo connection 38 to provide a releasable connection to a cargo so that the drone may be connected to and released from a cargo either by an operator or by an electronically controlled hook, for example. The sensor suite 28 may include a suitable load sensor to detect properties of the cargo such as its mass and load bias/centre of gravity. In embodiments, the drone 20 may attach to or release its cargo by moving relative to the cargo so as to couple or decouple with the cargo. For example, in particular embodiments, the cargo may be connected to the drone 20 via a sling or sock which can be positioned underneath the cargo or removed therefrom by flying along the cargo thereby hooking or unhooking the cargo in the sling or sock. In any case, the drone 20 bring with it any special lifting equipment to the ground after a lift.

Figure 2:
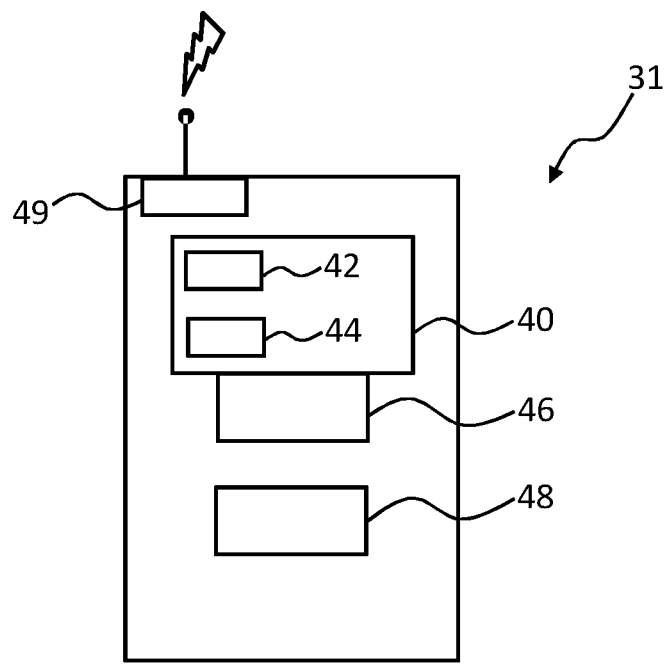
FIG. 2 is a schematic diagram of a control station for use with the unmanned air vehicle system of FIG. 1.

Having described the functional components of the drone 20, discussion will now turn to the control station 31 as shown in FIG. 2. Control station 31 provides a control hub for the one or more drones 20 and is suitably equipped with a computing platform 40 having an appropriate processing module 42 and memory storage 44. The computing platform implements a suitable control station software package 46 to provide appropriate control station facilities for controlling and coordinating the one or more drones. For example, the software package may include telemetry feeds, status information updates, first person visual (FPV) feeds, mission planning interfaces and algorithms and so on. A user interface 48 is provided to enable to a user/operator to view data relating to the drone system and to input control and parameter data into the control station. The user interface 48 may comprise of a display screen and audio output, and a user input means such as a keyboard, joystick, mouse, on-screen buttons or a combination of these. The control station also has a communications system 49 in order to send data to and receive data from the one or more drones. The control station 31 could be a ground based system or could be mounted in the nacelle, for example.

It should be appreciated that the above description of a drone system 20 is intended as merely an example of the main components of an autonomous air vehicle and that other components may also be included in a typical system. In general, it should be noted that drones for use in the embodiments of the invention are known and are able to perform in remote control flight modes, semi- and fully-autonomous flights modes, and are able to carry out manoeuvres in a coordinated fashion in fixed positional relationship with other drones.

A suitable type of drone is the K-Max® unmanned aircraft system from Kaman Aerospace or Northrop Grumman MQ-8C Fire Scout unmanned aircraft system.

As described above, the present invention relates to the use of one or more such drones in conjunction with at least one crane in order to handle a wind turbine component.

The use of drones to support the lifting of the component may mean that smaller cranes can be used for this purpose. In particular, wind turbine mounted cranes, also referred to as service cranes, may be used for handling the component.

Service cranes may be smaller than a conventional ground based crane of sufficient capacity to handle the component without the assistance of one or more drones. Furthermore, the service crane may be mounted to the wind turbine temporarily, such that the crane may be removed from the wind turbine after use.

Temporary service cranes may be mounted to the wind turbine nacelle, or nacelle structure, using one or more dedicated attachment points and foundations or alternatively may be mounted to one or more existing structures of the wind turbine such as the pitch blade mechanism. Such service cranes are described in greater detail in European Patent No. EP2344753 or EP2245304, for example.

Figure 3:
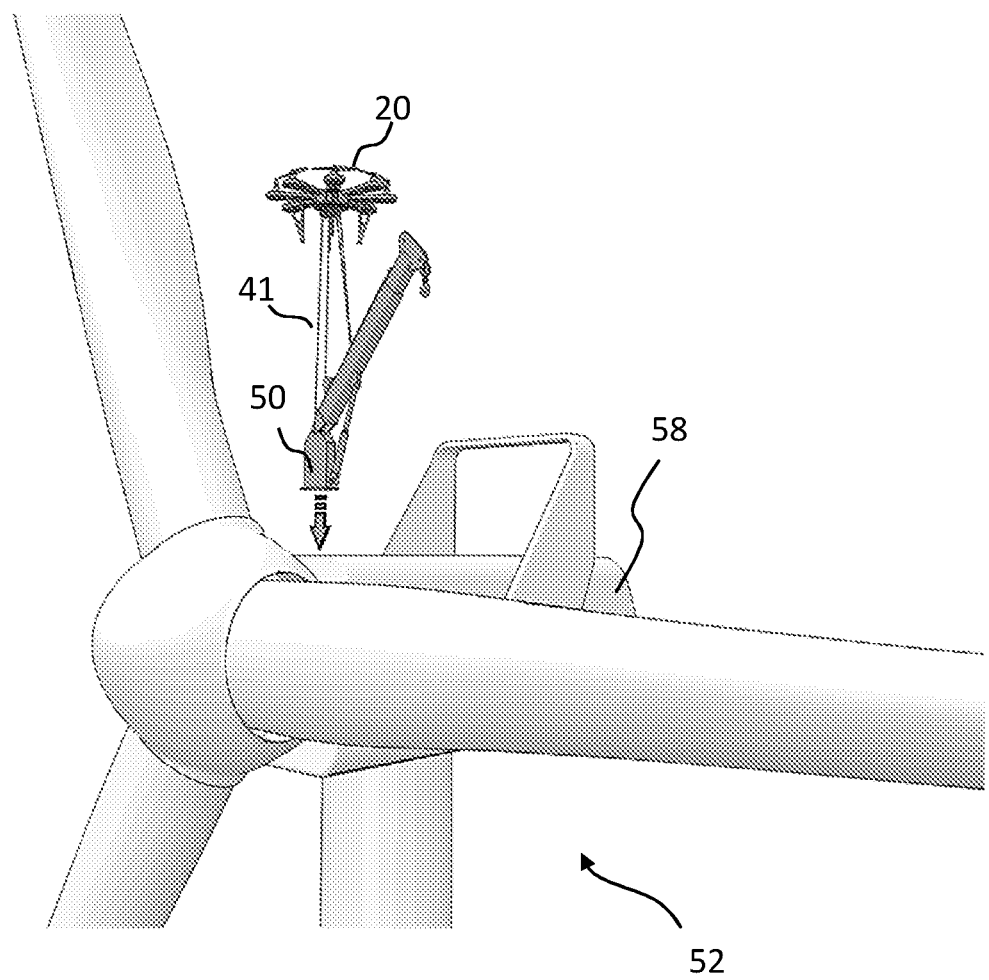
FIG. 3 shows an unmanned air vehicle positioning a crane on the nacelle of a wind turbine.

In embodiments, a drone 20 as described above may be used to install the crane 50 in position on the wind turbine 52. This is shown in FIG. 3. The drone 20 used to position the crane 50 may be the same one as used to position the blade 54, for example. However, positioning of the crane 50 may require less power than positioning of the blade 54 and therefore a smaller or lower power drone 20 may be used. In embodiments where a plurality of drones is used to position the blade, one of the plurality of drones may be used to position the crane 50, for example. The drone 20 may be coupled to the crane 50 for a loading position (such as from the ground or from a container vehicle) via any known coupling mechanism as known in the art including those examples described above. In the illustrated example, the drone 20 is coupled with the crane 50 via a number of lifting cables 41 attached to the drone 20 and the crane 50 and configured to support the weight of the crane 50 as the drone 20 is in flight.

The drone 20 may then be controlled, as described above, to lift the crane 50 and manoeuvre it into a suitable position on the nacelle 58 of a wind turbine 52 for attachment thereto. Attachment of the crane 50 to a structure of the nacelle 58 such as a dedicated foundation, may be facilitated by the drone 20 and/or may be facilitated by personnel positioned on the nacelle 58.

Figure 4:
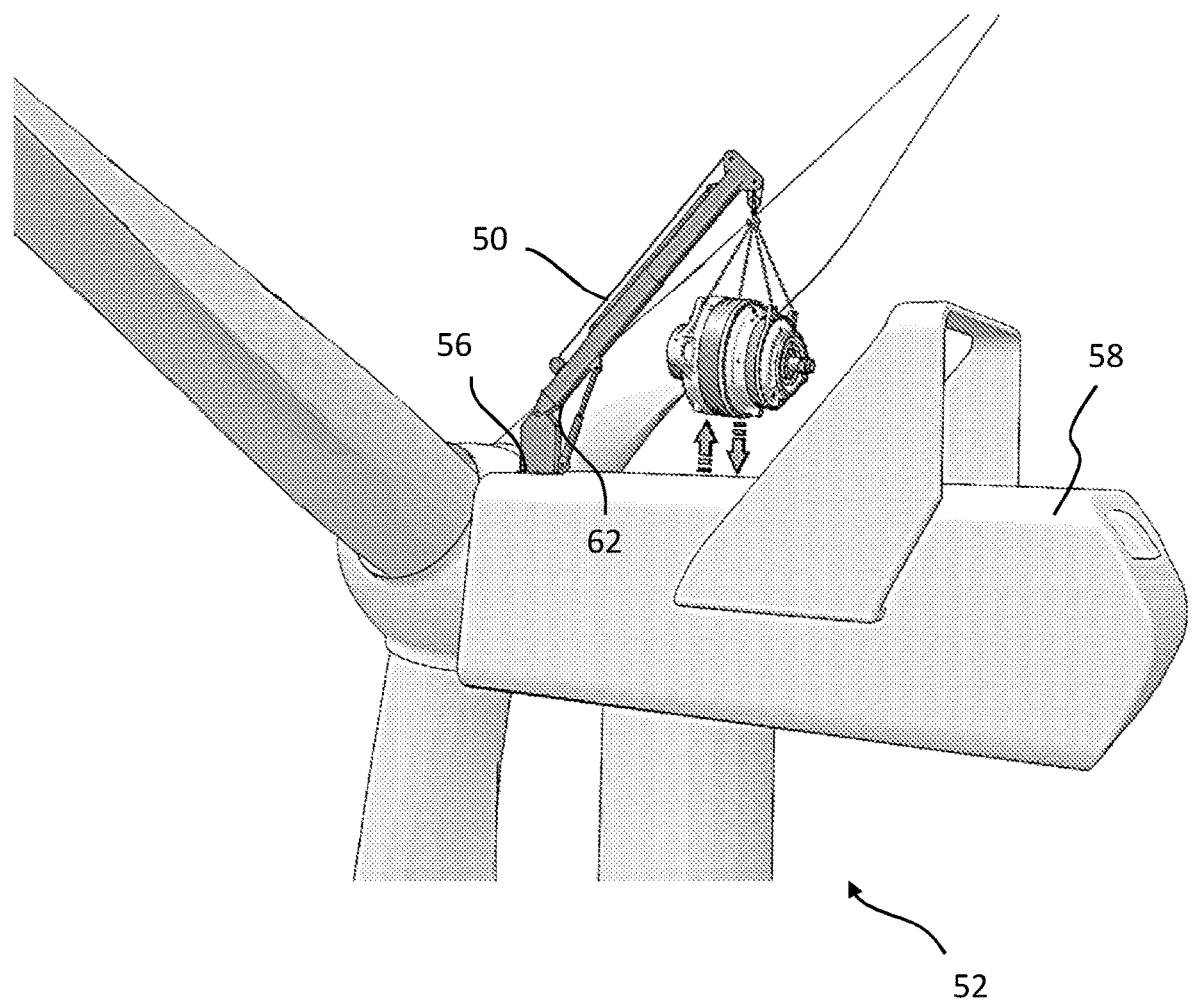
FIG. 4 shows an example crane mounted to the nacelle of a wind turbine for handling components thereof.

FIG. 4 shows an example service crane 50 mounted to a wind turbine 52 nacelle structure for lifting a component 54, such as a gearbox.

In some embodiments the crane will lift components with a smaller extend, such as the gearbox or generator, with the assistance of one or more drones 20 (not shown in FIG. 4).

The crane 50 comprises a base 56 for attachment to a crane foundation (not shown) mounted to the nacelle 58 of the wind turbine. The base 56 is attached to the foundation such that the crane 50 is able to sustain considerable loads, sufficient to lift and position a wind turbine component 54. The crane 50 further comprises a telescopic arm 60. The telescopic arm 60 may be further articulated via one or more joints 62 on the arm 60 to extend the range of movement thereof. The crane 50 further comprises a rotating joint (not shown) between the base 56 and arm 60 in order to allow the arm 60 to rotate about the base 56.

Movement of the crane 50 may be controlled by any of the means described above in relation to the example drone 20. In embodiments, the control station 31 also provides control of the crane 50 in conjunction with the drone 20 to allow co-ordinated movement of each of the crane 50 and drone 20 for effective handling of a wind turbine component 54.

The above discussion focuses on particular examples of drone and crane systems which may be used to give the invention context. The discussion will now focus on particular functionality of the drones and cranes, referred together as the component handling system. The particular embodiments will be described in relation to the component handling system comprising one drone and one crane, although it will be appreciated that the handling system could comprise more than one drone and/or crane without departing from the scope of the invention. Moreover, although the embodiments are described with reference to the positioning of a turbine blade, it will be appreciated that the teaching herein could be applied to the positioning of other wind turbine components, such as generators, gear boxes, hubs, bearings and the like.

Figure 5:
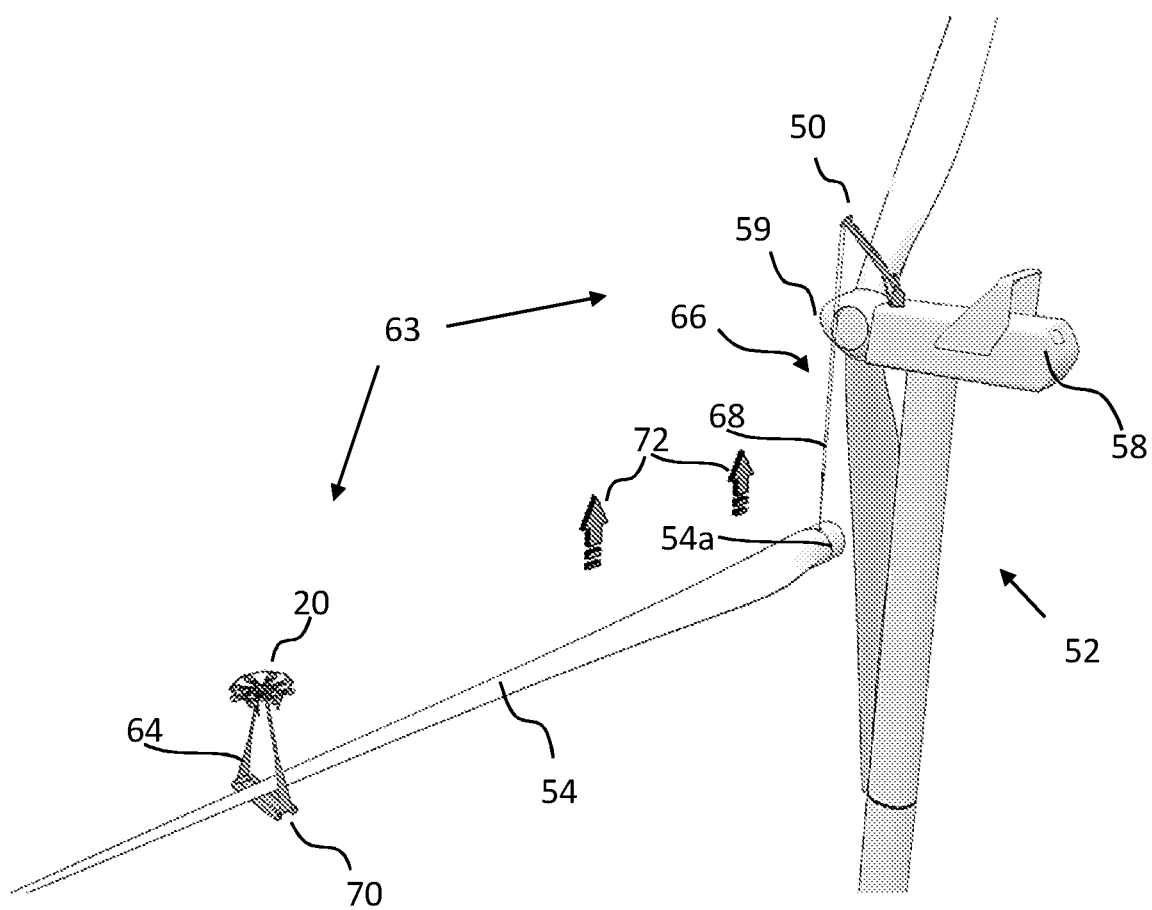
FIG. 5 shows a wind turbine blade being lifted by a crane and an unmanned air vehicle.

FIG. 5 shows an embodiment of the invention in which a component handling system 63, comprising a drone 20 and service crane 50, is being used to lift a wind turbine blade 54 of a wind turbine 52. The drone 20 and/or crane 50 may have a systems-level architecture like that described above. The drone 20 may be deployed from a mobile base such as a truck or boat with the appropriate control and recharging facilities for the drone 20. Additionally or alternatively, the drone 20 may be powered by a power cable or tether extending between the control station 31 and the drone 20. The control station 31 may be stationed on the mobile base. Here, the drone 20 is shown as having been deployed and moved to a position proximal to the wind turbine blade 54 and is shown as supporting the blade 54 above the ground by way of a drone support system 64. The service crane 50 is attached to the blade 54 at a hub end 54*a* thereof by way of a crane support system 66.

In order to lift the blade 54, in this embodiment the drone 20 and crane 50 must be controlled in a coordinated way to generate the required lifting force to get the mass of the blade 54 airborne. One way in which this could be achieved is by way of a manual process in which an operator controls the positioning of the drone 20 and crane 50 simultaneously. In embodiments, a control means is configured to control both the drone 20 and the crane 50 in a coordinated way in order to manoeuvre the blade 54. The control means may directly control both the drone 20 and the crane 50 simultaneously or, in some embodiments, one of either the crane 50 or drone 20 may be directly controlled, with the other of the crane 50 or drone 20 being configured to automatically position itself relative to the controlled system, for example in a master-slave control relationship.

It is envisaged that the subject of control could be the orientation and position of the component 54 that is lifted. For example the parameters that are the subject of the control could be the position of the blade root 54*a* and the orientation/attitude of the centreline of the blade 54. The crane 50 and drone 20 could therefore act in a coordinating regime in order to control the centreline and the blade root position in accordance with commands sent by an operator. In effect, therefore, the crane 50, drone 20 and component 54 are operably connected to represent a single remote controlled air system, such that the operator simply has to concentrate on the positioning of the component 54 and the control station 31 or the component handling system carries out the interpretation of the operator comments in order to control each of the crane 50 and drone 20 to achieve that objective.

Instead of manual control, the component handling system is also controllable automatically by the control station 31 on the basis of a predetermined mission profile. This would instruct the crane 50 and drone 20 about the load they are to carry and the flight formation or pattern that is required.

Control of the component handling system 63 may include the use of a tilt meter (not shown). The tilt meter may detect the orientation of the blade 54 and deliver this information to the control station 31, for example. The control station 31 may use this information to adjust the position of the drone 20 and/or crane 50 to sure that the blade 54 is maintained in the correct orientation for installation, for example the control station 31 may be configured to maintain the blade 54 in a generally horizontal position using the tilt meter during installation. The tilt meter may comprise one or more sensors configured to detect orientation as known in the art.

As discussed above, the crane 50 is coupled with the blade 54 via the crane support system 66 such that at least a portion of the weight of the blade 54 can be supported by the crane 50. The crane support system 66 is configured such that movement of the crane 50 results in movement of the blade 54 relative to the wind turbine 52. The crane support system 66 is further configured to allow both vertical and horizontal movement of the blade 54 with respect to the wind turbine 52.

In the illustrated embodiment, the crane support system 66 comprises a cable 68 which is attached to the blade 54 at a root end 54*a* thereof. More particularly, the crane support system 66 comprises an attachment means, such as a hook or clip (not shown), configured for attachment to a corresponding attachment feature on the blade 54.

In embodiments, the crane support system 66 may comprise a clamp, sling system or other mechanical means for coupling the crane 50 with the blade 54 to allow the crane 50 to both support the weight of the blade 54 and manoeuvre it.

In embodiments the crane 50 and crane support system 66 allow the crane 50 to support at least 25% of the weight of the blade 54. For example, the crane 50 may support at least 30% or 50% of the weight of the blade 54. In an embodiment, the crane 50 is configured to support 80-90% of the weight of the blade 54, with the remainder of the weight of the blade 54 being supported by the drone 20.

The drone 20 is coupled with the blade 54 via the drone support system 64 such that at least a portion of the weight of the blade 54 can be supported by the drone 20. The drone support system 64 is configured such that movement of the drone 20 results in movement of the blade 54 relative to the wind turbine 52. The drone support system 64 is further configured to allow both vertical and horizontal movement of the blade 54 with respect to the wind turbine 52.

In the illustrated embodiment, the drone support system 64 comprises a lifting device in the form of a sling 70 that extends from the drone 20 an underneath the blade 54 in order to support its weight. The lifting sling 70 may be made of any suitable material, but one option is a relatively wide woven nylon webbing material which is able to spread the load of the blade across a wide enough contact patch so as to avoid damaging the blade 54. The webbing could advantageously be provided with a high friction surface material that improves the ability of the sling 70 to maintain its position on the blade 54 even when subject to a laterally directed force.

Additionally or alternatively, the drone support system 64 may include a tube-like lifting sock or sheath into which the blade can be received. One or more support lines can then be attached to the drone 20 and the lifting sock by which means the drone 20 is able to lift the blade 54 into the air. Further lifting devices may include a shackle mounted to the blade 54 and attached to the drone 20 via a lifting line, for example.

In embodiments the drone and drone support 54 system allows the drone 20 to support at least 25% of the weight of the blade 54. For example, the drone 20 may support at least 30% or 50% of the weight of the blade 54. In an embodiment, the drone 20 is configured to support 10-20% of the weight of the blade 54, with the remainder of the weight of the blade 54 being supported by the crane 50.

The positions of crane support system 66 and drone support system 64 at spaced apart positions along the length of the blade 54 are selected to provide a balanced lift so that the blade 54 remains at a predetermined orientation as it is lifted into the air. Preferably the blade 54 remains straight and level (horizontal), although that is not essential.

According to the embodiments, the crane 50 and drone 20 together support 100% of the weight of the blade 54 and together move the blade 54 to a desired position such as during assembly of the blade 54 onto the hub of the wind turbine 52.

Once the crane 50 and drone 20 are coupled to the wind turbine blade 54, the component handling system 63 may then lift the component 54 upwards as shown by the arrows 72 in FIG. 5. This action may be in response to an operator either controlling the handling system 63 manually, or it may also be achieved by an operator triggering a 'lift and position' portion or phase of a mission profile in which the handling system 63 lifts the component 54 and positions it relative to the wind turbine 62 in order that it may be fixed into position.

In FIG. 5, the crane 50 and drone 20 are lifting the wind turbine blade 54 upwards towards a nacelle 58 of a wind turbine 52 in the direction of the arrows. As can be seen in the figure, the wind turbine 52 is a typical horizontal-axis wind turbine (HAWT) in which the nacelle 58 includes a hub 59 that supports a three-bladed rotor, as is a common configuration. The hub 59 has two blades attached to it, and is set into an angular position where it can receive the third blade 54, which is being lifted by the crane 50 and drone 20, in a horizontal orientation.

Figure 6:
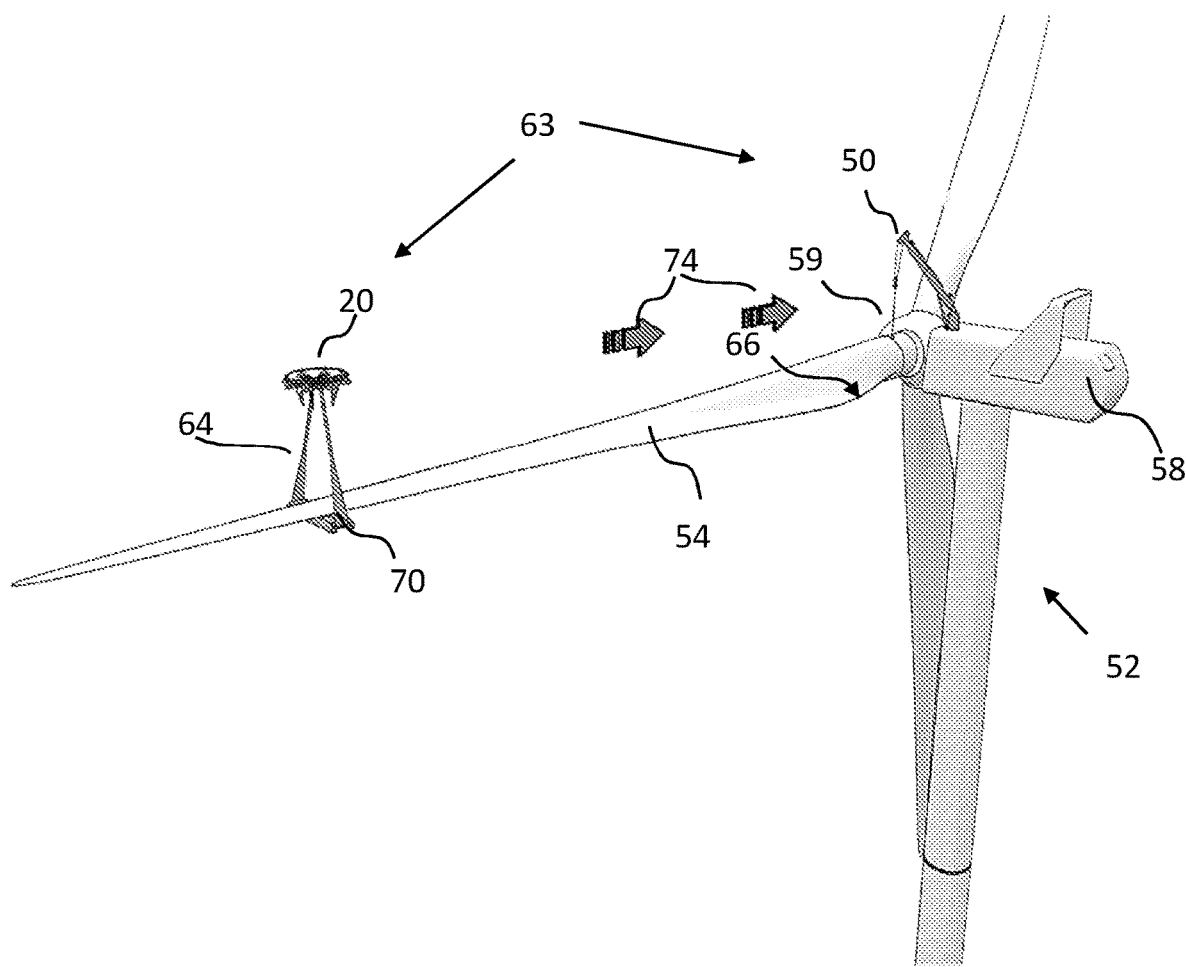
FIG. 6 shows a wind turbine blade being positioned for assembly on a hub of a wind turbine.

In FIG. 6, the component handling system 63 is moving the blade 54 into position on the hub 59 in which the blade 54 can be attached. In particular, the component handling system 63 may move the blade 54 in a horizontal direction as shown by the arrows 74.

The positioning and flight control of the component handling system 63 may generally be achieved using a satellite positioning system as described above, although to ensure the positional accuracy required it is currently envisaged that a differential GPS system will be preferred. Differential GPS technology would be well-understood by the skilled person. Although such a system may be adequate on its own to enable the component handling system 63 to position the blade 54 next to the hub 59 in the correct position so that the blade root is directly adjacent the root socket of the hub 59, further guidance may be useful.

Thus, in the embodiments of FIGS. 5 and 6 the component handling system 63 may further comprise a guidance system 80 which is operable to provide data/information to the component handling system 63 regarding the relative position of the wind turbine component 54 with respect to the wind turbine 52 for accurate positioning and docking of the component 54.

Figure 7:
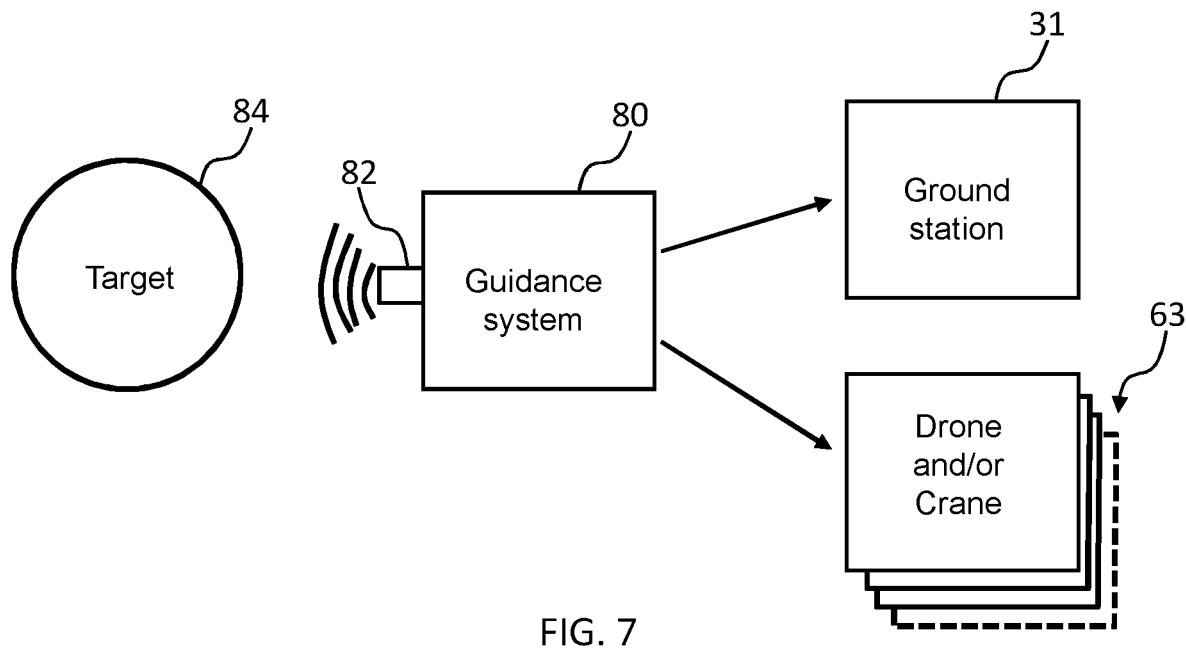
FIGS. 7 and 8 are schematic views of guidance systems for use with the unmanned air vehicle system of the embodiments of the invention.

The guidance system 80 may be embodied in various ways. Referring to FIG. 7, in one embodiment the guidance system 80 may include a radar transceiver 82. The radar transceiver 82 may be attached to the blade and oriented to point towards the hub 59 of the nacelle 58 so that it views the circular blade root socket on the hub 59 as a target 84. The guidance system 80 will have an appropriate knowledge database to recognise the shape of the hub and provide flight path information to the component handling system 63 and/or the control station 31 so that the drone 20 and crane 50 are able to position themselves appropriately. Instead of radar, a lidar (Light Detection and Ranging) based guidance system is also considered to be appropriate.

As an alternative to the above approach, the radar transceiver 82 may instead be positioned in the hub 59 such that the root of the wind turbine blade is the target 84. The guidance system 80 will transmit guide path information to the component handling system 63 either directly or via the control station 31, in order to guide the wind turbine component 54 into position.

Figure 8:
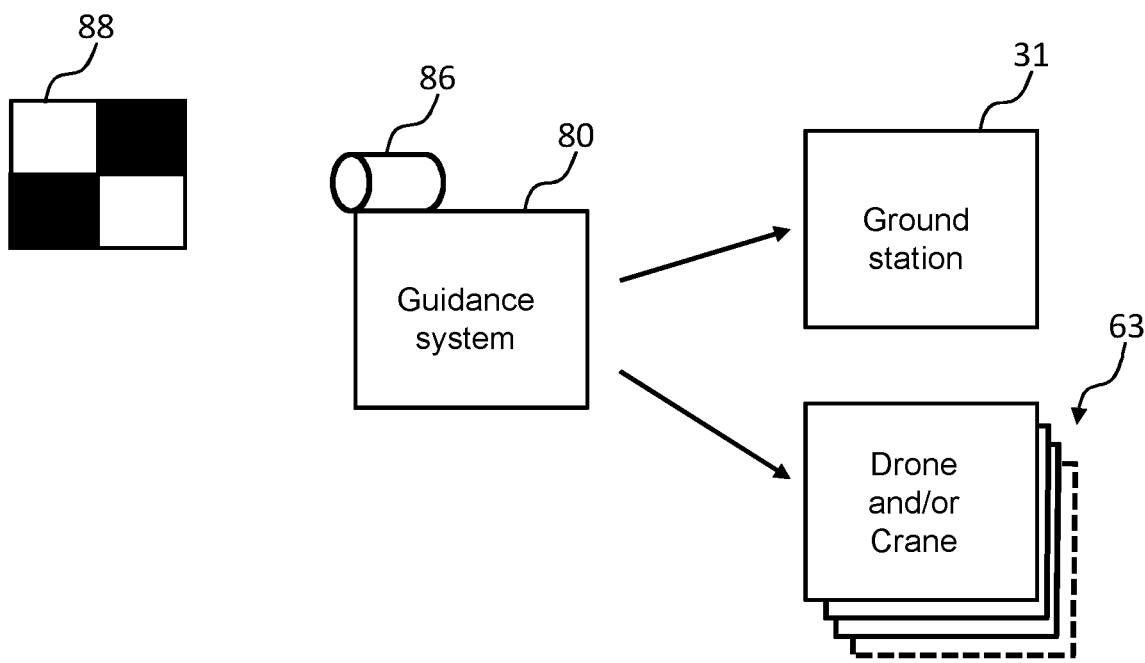

FIG. 8 shows a further alternative embodiment in which the guidance system 80 includes an optical camera 86. The optical camera 86 may be positioned on the blade 54 or in the hub 59 and may be configured to view an appropriate optical target 88. The guidance system 80 therefore is able to recognise the optical target 88 and derive information about the relative distance and orientation of the target in order to provide the component handling system 63 and/or the control station 31 with suitable guide path information so that the component handling system 63 is able to guide the wind turbine component 54 into the desired position.

In the embodiments described above, it will be appreciated that the wind turbine components may represent significant loads for the drones to lift into the air. Relatively small tool packages and components such as electronics units and the like may be suitable for lifting with one or a small number of relatively low-capacity drones able to lift a few 10s of kg. The mass of wind turbine components that need to be lifted can easily exceed 1 tonne, and may approach 10 tonnes or more, which would require a relatively large number of multirotor type unmanned air vehicles in order to lift said components safely and reliably, allowing for failure of individual drones for example. Larger components may require one or two very high lift capacity unmanned air vehicles such as remote controlled heavy lift helicopters or, alternatively, a high number of industrial-grade multirotors, for example quadcopters, pentacopters, hexacopters, octacopters, etc. as described in greater detail above.

Figure 9:
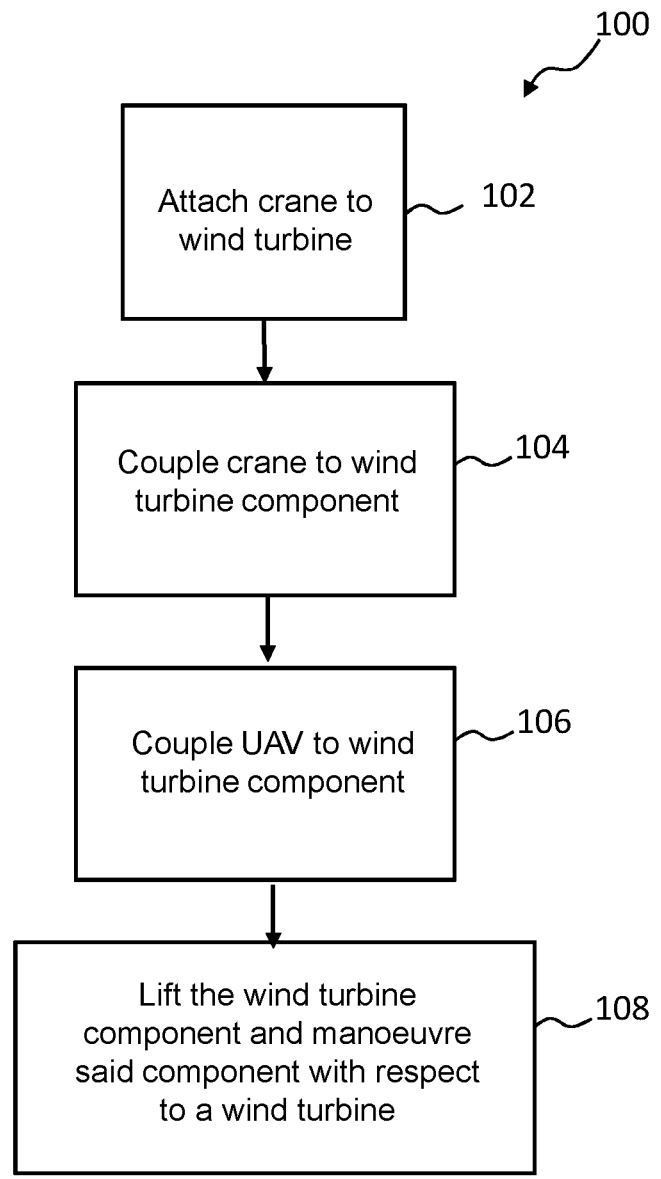
FIG. 9 is a diagram illustrating steps of a method according to an embodiment of the invention.

Referring briefly to FIG. 9, this is a diagram illustrating steps of a method 100 according to an embodiment of the invention in order to handle a component of a wind turbine. Firstly, one or more cranes are attached 102 to the wind turbine.

The crane may be attached to the wind turbine using a drone, for example, as described in relation to the embodiment above. The crane may be attached to a nacelle of the wind turbine. Once the crane is attached, the crane is coupled 104 to the component so that the crane can be configured to support at least a portion of the weight of that component.

One or more UAV or drone is then coupled 106 to the component so that the drone can be configured to support at least a portion of the weight of the component. It will be appreciated that the drone may be coupled to the component before or after coupling of the crane thereto.

Once the crane and drone have been coupled 104, 106 to the wind turbine component, they are then able to be controlled 108 to lift the wind turbine component and manoeuvre said component with respect to a wind turbine. Thus, the wind turbine component can be lifted and positioned conveniently with the use of the crane and drone during assembly and maintenance tasks. In addition to lifting and positioning wind turbine components with respect to a wind turbine so that they can be connected to the wind turbine during assembly, the drones may also be used to lift wind turbine components away from the wind turbine, as may be required during a replacement operation, for example.

The skilled person would appreciate that the specific embodiment discussed here could be modified or adapted in such a way so as not to depart from the inventive concept as defined by the claims. Other variants are also possible.

The invention claimed is:

1. A method of handling a wind turbine component for assembly or maintenance, the method comprising:
   coupling one or more unmanned air vehicle with the wind turbine component so that at least a portion of the weight of the wind turbine component can be supported and lifted by the one or more unmanned air vehicle;
   coupling one or more crane with the wind turbine component so that at least a portion of the weight of the wind turbine component can be supported and lifted by the one or more crane, wherein the one or more crane is mounted to a nacelle of a wind turbine; and
   controlling the one or more unmanned air vehicle and crane in coordination to lift the wind turbine component and manoeuvre said component with respect to the wind turbine,
   wherein the one or more crane is attached to the component at a first position on the component and the one or more unmanned air vehicle is attached to the component at a second position on the component spaced from the first position.

2. The method of claim 1, wherein the unmanned air vehicle supports the component by way of a lifting device such that the unmanned air vehicle can support the component from above.

3. The method of claim 1, wherein the one or more crane supports the component by way of a hook, clamp or sling.

4. The method of claim 1, comprising coupling a plurality of unmanned air vehicles to the component.

5. The method of claim 1, comprising mounting the one or more crane to the wind turbine using one or more unmanned air vehicles.

6. The method of claim 1, wherein the at least one crane supports at least 50% of the weight of the component during handling thereof.

7. The method of claim 1, wherein the relative positions of the unmanned air vehicle and crane are coordinated so that the wind turbine component is lifted in a predetermined orientation.

8. The method of claim 1, wherein one of either the unmanned air vehicle or crane is designated a master device, the other of the unmanned air vehicle or crane being slave device, whereby the relative positions of the slave device are coordinated with that of the master device.

9. The method of claim 8, wherein the master device sends signals to the slave device to coordinate movement thereof.

10. The method of claim 1, wherein the wind turbine component is a wind turbine blade.

11. The method of claim 1, further including guiding the component to the wind turbine using a guidance system.

12. The method of claim 11, wherein the guidance system is an optical guidance system, a radar-based guidance system or a lidar based guidance system.

13. A method of installing a crane on to a wind turbine comprising:
   coupling an unmanned air vehicle with the crane;
   using the unmanned air vehicle to lift the crane to be mounted to the wind turbine; and
   mounting the crane to the wind turbine.

14. A system for handling a component of a wind turbine, comprising:
   an unmanned air vehicle;
   a crane attached to a nacelle of the wind turbine;
   one or more coupling means configured to couple the unmanned air vehicle and the crane to the component such that at least a portion of the weight of the wind turbine component can be supported and lifted by each of the one or more unmanned air vehicle and one or more crane and such that operation of the unmanned air vehicle and crane causes movement of the component; and
   a control means to control the unmanned air vehicle and the crane in coordination so as to manoeuvre the component,
   wherein the crane is configured to be attached to the component at a first position on the component and the unmanned air vehicle is configured to be attached to the component at a second position on the component spaced from the first position.

15. The system of claim 14, comprising a control station computer system for controlling movement of the unmanned air vehicle and/or crane.

16. The system of claim 14, wherein the unmanned air vehicle is configured to implement autonomous flight routines.

17. The system of claim 14, wherein one of the unmanned air vehicle or crane is configured as a master device, and the other of the unmanned air vehicle or crane is configured as a slave device, wherein the slave device coordinates its movement with the movement of the master device.

18. The system of claim 14, further comprising a guidance system associated with the wind turbine component, wherein the guidance system is adapted to communicate with the unmanned air vehicle and or crane in order to guide the wind turbine component towards a target position.

19. The system of claim 18, wherein the guidance system includes one or more of an optical guidance system, a radar-based guidance system or a lidar based guidance system.

20. The system of claim 14, wherein the unmanned air vehicle is electrically powered.

21. The method of claim 1, wherein the first position on the component and the second position on the component are on opposing sides of a center of gravity of the component.

22. The system of claim 14, wherein the first position on the component and the second position on the component are on opposing sides of a center of gravity of the component.

* * * * *